(12) United States Patent
Honjo

(10) Patent No.: US 10,167,931 B2
(45) Date of Patent: Jan. 1, 2019

(54) WORK VEHICLE

(71) Applicant: Kubota Corporation, Osaka-shi (JP)

(72) Inventor: Noriyasu Honjo, Sakai (JP)

(73) Assignee: Kubota Corporation, Osaka (JP)

( * ) Notice: Subject to any disclaimer, the term of this patent is extended or adjusted under 35 U.S.C. 154(b) by 21 days.

(21) Appl. No.: 15/616,027

(22) Filed: Jun. 7, 2017

(65) Prior Publication Data

US 2018/0038460 A1   Feb. 8, 2018

(30) Foreign Application Priority Data

Aug. 8, 2016   (JP) ................. 2016-155587

(51) Int. Cl.
*F16H 9/18*   (2006.01)
*B60K 17/08*   (2006.01)
*F16H 25/22*   (2006.01)
*F16H 57/01*   (2012.01)
*F16H 9/20*   (2006.01)
*F16H 57/04*   (2010.01)

(52) U.S. Cl.
CPC ............... *F16H 9/18* (2013.01); *B60K 17/08* (2013.01); *F16H 25/22* (2013.01); *F16H 57/01* (2013.01); *F16H 9/20* (2013.01); *F16H 57/0416* (2013.01); *F16H 57/0489* (2013.01); *F16H 2057/012* (2013.01)

(58) Field of Classification Search
None
See application file for complete search history.

(56) References Cited

U.S. PATENT DOCUMENTS 4,884,669 A * 12/1989 Ehrlinger ................ B60T 1/062
                                                                192/216
5,416,698 A *  5/1995 Hutchison ............... F16H 61/16
                                                                192/3.3
7,794,344 B2 *  9/2010 Ishioka ............. F16H 61/66259
                                                                474/28

FOREIGN PATENT DOCUMENTS

JP           201251505 A      3/2012

* cited by examiner

*Primary Examiner* — Dirk Wright
(74) *Attorney, Agent, or Firm* — The Webb Law Firm

(57) ABSTRACT

A work vehicle having a belt type stepless speed changing mechanism includes a rotation detecting section for detecting an engine rotational speed, a vehicle speed detecting section for detecting a vehicle speed of a traveling vehicle body and an informing section configured to effect an alarm informing for alarming wear of a drive belt if a vehicle speed detected by the vehicle speed detecting section is a predetermined vehicle speed deviates from a preset permissible range.

5 Claims, 5 Drawing Sheets

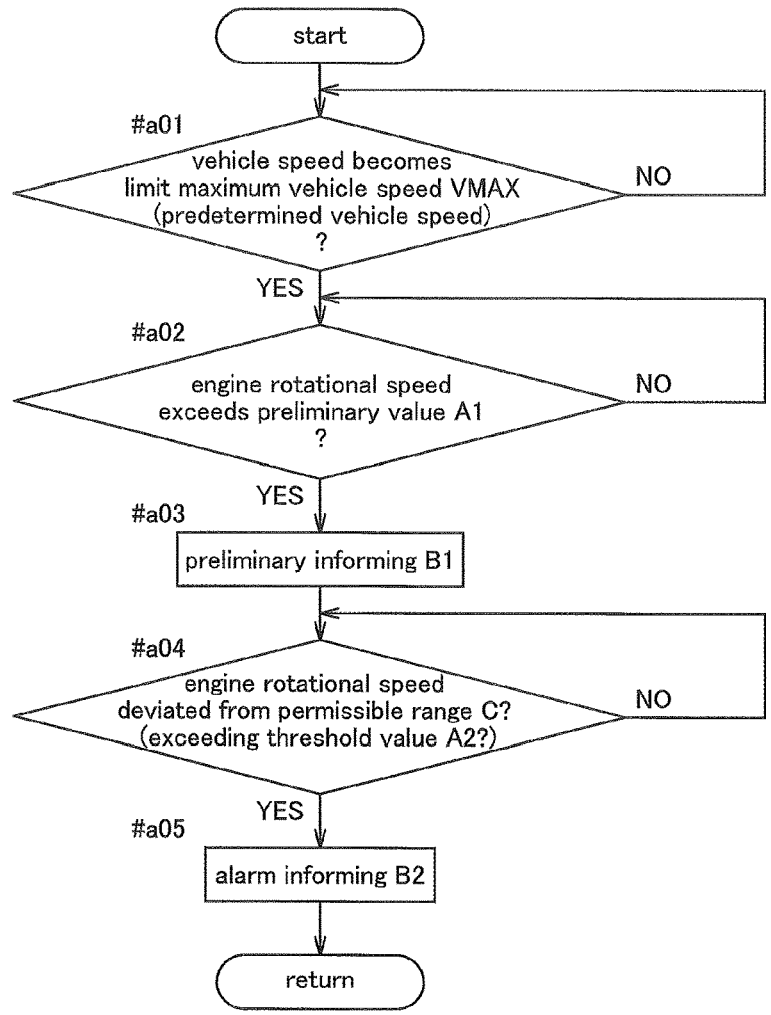
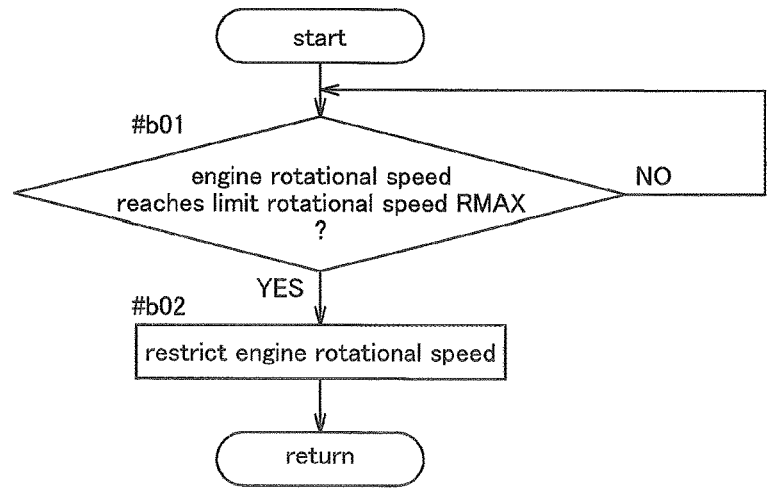

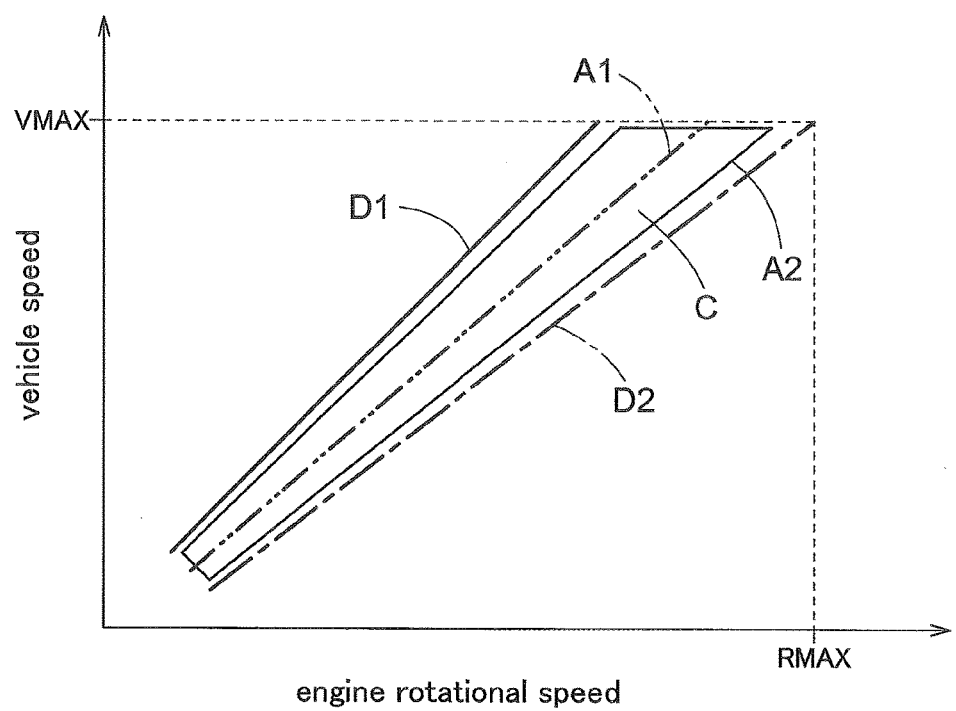

WORK VEHICLE

CROSS-REFERENCE TO RELATED APPLICATION

This application claims priority to Japanese Patent Application No. 2016-155587 filed Aug. 8, 2016, the disclosure of which is hereby incorporated in its entirety by reference.

BACKGROUND OF THE INVENTION

1. Field of the Invention

This invention relates to a work vehicle such as a multi-purpose vehicle having a belt type stepless speed changing mechanism.

2. Description of Related Art

A conventional work vehicle of the above noted type is disclosed in e.g. JP 2012-051505 A. With the belt type stepless speed changing mechanism, wear of its component such as a drive belt develops after its use for a certain period, so that a maintenance operation, such as replacement of a component, etc. becomes necessary.

In a conventional and general practice, the belt type stepless speed changing mechanism is disassembled to determine e.g. a state of the driving belt in order to determine whether it is necessary to carry out a maintenance operation of the belt type stepless speed changing mechanism or not. However, such an operation is not only troublesome but also requires a skill for the determination, so that an operator and/or person associated therewith, typically a user of the work vehicle, cannot carry out the operation easily.

Moreover, since degree of development of the wear in the component of the belt type stepless speed changing mechanism, such as a drive belt, depends largely on its use condition, it was difficult to determine the timing of carrying out the maintenance operation of the belt type stepless speed changing mechanism with relying solely on its period of use.

In view of the above, there is a need for a work vehicle that allows an operator and/or person associated therewith to easily grasp the appropriate timing to carry out a maintenance operation of the belt type stepless speed changing mechanism.

SUMMARY OF THE INVENTION

In view of the above, a work vehicle is provided as under:
A work vehicle comprising:
a traveling device;
a traveling vehicle body that is self-propelled by the traveling device;
an engine mounted on the traveling vehicle body;
a belt type stepless speed changing mechanism having an input rotary body, an output rotary body, and a drive belt wound around and between the input rotary body and the output rotary body, the belt type stepless speed changing mechanism being configured to steplessly speed-change power from the engine and to transmit the speed-changed power toward the traveling device;
a rotation detecting section for detecting a rotational speed of the engine;
a vehicle speed detecting section for detecting a vehicle speed of the traveling vehicle body; and
an informing section, wherein if the vehicle speed detected by the vehicle speed detecting section is a predetermined speed and if the engine rotational speed detected by the rotation detecting section deviates from a preset permissible range, the informing section is configured to effect an alarm informing for alarming wear of the drive belt.

The above arrangement is preferred in following regard:
When wear develops in the drive belt of the belt type stepless speed changing mechanism, compared with one without wear, the width of the belt decreases. This tends to invite reduction in power transmission efficiency, due to e.g. change in winding diameter of the drive belt each around the input rotary body and the output rotary body, as well as slippage of the drive belt. As a result, with development of wear of the drive belt, the speed changing ratio of the belt type stepless speed changing mechanism will gradually change, which in turn leads to change in the relationship between the engine rotational speed on the input side and the vehicle speed as the final output result.

With the inventive arrangement, in order to utilize such change that occurs with development of wear of the drive belt of the stepless speed changing mechanism, a permissible range is set in advance for an engine rotational speed when the vehicle speed is at a predetermined speed, with taking into consideration wear of the drive belt of the stepless speed changing mechanism. Then, if the engine rotational speed, which is detected when the vehicle speed is the predetermined speed during actual traveling, should deviate from the permissible range, then it is determined that wear of the drive belt has developed to such a degree that requires maintenance of the belt type stepless speed changing mechanism, and attention by e.g. an operator is prompted with the alarm informing for alarming wear of the drive belt. Whereby, the operator and/or person associated therewith can easily grasp need for maintenance of the belt type stepless speed changing mechanism without taking the trouble of disassembling this belt type stepless speed changing mechanism. Consequently, continued use with excessive development of wear of the drive belt can be avoided also.

In this way, with the inventive arrangement, an operator and/or person associated therewith can easily grasp the appropriate timing to carry out a maintenance operation on the belt type stepless speed changing mechanism.

In one preferred embodiment, the predetermined vehicle speed is a limit maximum vehicle speed which is preset as a vehicle speed that requires restriction of rotation of the engine; and the informing section effects the alarm informing if the engine rotational speed at the time of the limit maximum vehicle speed exceeds a predetermined threshold value.

With the arrangement, if the vehicle speed becomes a preset limit maximum vehicle speed, the belt type stepless speed changing mechanism is under the predetermined speed changing state. Thus, the comparison of the engine rotational speed can be effected with higher accuracy, compared with e.g. a conceivable arrangement of effecting the comparison of engine rotational speed in a vehicle speed range in which the speed changing ratio of the belt type stepless speed changing mechanism varies in a stepless manner. Further, in case the speed changing ratio of the belt type stepless speed changing mechanism becomes greater with development of wear of the drive belt, the determination respecting the wear of the drive belt can be effected advantageously by basing such determination on presence/absence of excessive value over a predetermined threshold value in a detected engine rotational speed that is obtained when the detected vehicle speed is the limit maximum vehicle speed. With this, alarm informing can be effected for an operator and/or person associated therewith at an appropriate timing.

In one preferred embodiment, the threshold value is an engine rotational speed at which the limit maximum vehicle speed is achieved in the belt type stepless speed changing mechanism having the drive belt which is under a predetermined wear state.

With the arrangement, an actual work vehicle mounting the belt type stepless speed changing mechanism having a drive belt under a predetermined wear state is caused to run for testing. Then, based on the result of this test run of the actual vehicle, a threshold value is set which is to be compared with the engine rotational speed at the time of the limit maximum vehicle speed. By using data of an actual vehicle in setting the threshold value as described above, the threshold value can be set with a more appropriate value than a case of setting the threshold value based on simulation data. Consequently, the alarm informing can be effected at a timing when wear of the drive belt has developed as expected.

In one preferred embodiment, the informing section effects a preliminary informing which is different from the alarm informing, if the engine rotational speed exceeds a preliminary value which is smaller than the threshold value.

With the arrangement, prior to the alarm informing for wear of the drive belt, a preliminary informing can be effected for informing the operator and/or person associated therewith that wear of the drive belt has developed to a certain degree. Thus, it becomes readily possible for the operator and/or person associated therewith to anticipate the timing to require/effect maintenance of the belt type stepless speed changing mechanism.

In one preferred embodiment, the engine rotational speed is restricted if this engine rotational speed exceeds a limit rotational speed which is set based on the threshold value, even if the vehicle speed does not reach the limit maximum vehicle speed.

With the arrangement, when wear of the drive belt of the belt type stepless speed changing mechanism develops and the detected engine rotational speed exceeds a limit rotational speed, irrespectively of a detected vehicle speed, further increase of the engine rotational speed is restricted. This arrangement can reduce the possibility of occurrence of excessive engine rotation state, thus protecting the engine against damage. Moreover, the arrangement can avoid also occurrence of undesirable phenomenon such as sharp and violent increase of an amount of soot contained in exhaust gas due to combustion failure of the engine.

Further and other features and advantages achieved thereby will become apparent upon reading the following description.

BRIEF DESCRIPTION OF THE DRAWINGS

FIG. 4 is a flowchart illustrating an exemplary flow of a preliminary informing and an alarm informing;

FIG. 5 is a flow chart illustrating an exemplary flow when restricting an engine rotational speed; and FIG. 6 is a diagram according to a further embodiment (Other Embodiment (1)) showing relationship between an engine rotational speed and a vehicle speed.

DETAILED DESCRIPTION OF THE PREFERRED EMBODIMENTS

One embodiment of a work vehicle according to the present invention will be described next. In the following description, a direction of arrow "F" shown in FIG. 1 will represent "front", a direction of arrow "B" shown in FIG. 1 will represent "rear", a direction of arrow "L" shown in FIG. 1 will represent "left" and a direction of arrow "R" shown in FIG. 1 will represent "right".

[General Arrangement]

Figure 1:
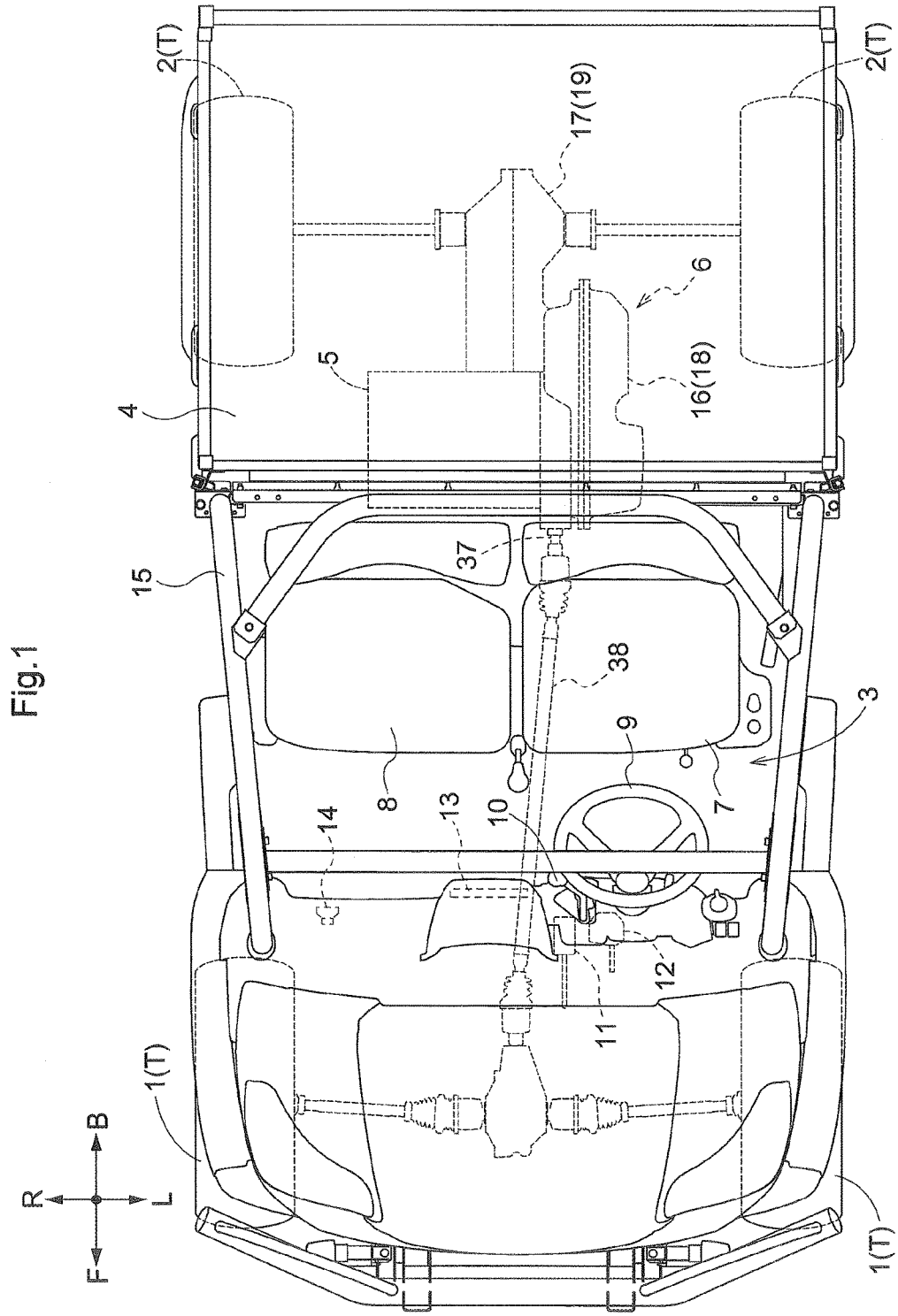
FIG. 1 is a plan view of a multipurpose vehicle in its entirety showing an example of a work vehicle according to one embodiment (same is applied through to FIG. 6)

A multipurpose vehicle (an example of a "work vehicle") showing in its entirety in FIG. 1 is a vehicle for multiple uses such as transportation of load, recreation, etc.

As shown in FIG. 1, the multipurpose vehicle includes a traveling vehicle body that is self-propelled by a traveling device T which includes a pair of left/right steerable and drivable front wheels 1 and a pair of left/right drivable rear wheels 2. At a front/rear center portion of the traveling vehicle body, there is provided a driving section 3 which an operator will get onboard. Rearwardly of the driving section 3 on the traveling vehicle body, there is mounted a load-carrying deck 4 capable of carrying load and dumping the load when assuming a rearwardly inclined posture. Downwardly of the load-carrying deck 4 on the traveling vehicle body, there are mounted a gasoline engine (to be referred to simply as an "engine 5" hereinafter) as a power source and a speed changing device 6 capable of speed-changing power of the engine 5.

As shown in FIG. 1, in the driving section 3, there are provided a driver's seat 7 on which the operator will be seated; an auxiliary seat 8 on which a passenger can be seated; a steering wheel 9 for effecting steering operations; a speed changing lever 10 for effecting speed changing operations; an accelerator pedal 11 acting as an operational input tool for varying a vehicle speed by commanding a target engine rotational speed for the engine 5 in order to change a vehicle speed; a brake pedal 12 capable of braking the vehicle; a meter panel 13 acting as a displaying device capable of displaying various kinds of information; and a buzzer device 14 acting as a sound generating device for generating a sound. A riding space in the driving section 3 to be occupied by a riding person (an operator and a passenger) is surrounded and protected by a protecting frame 15 comprising an assembly of frame members.

Figure 2:
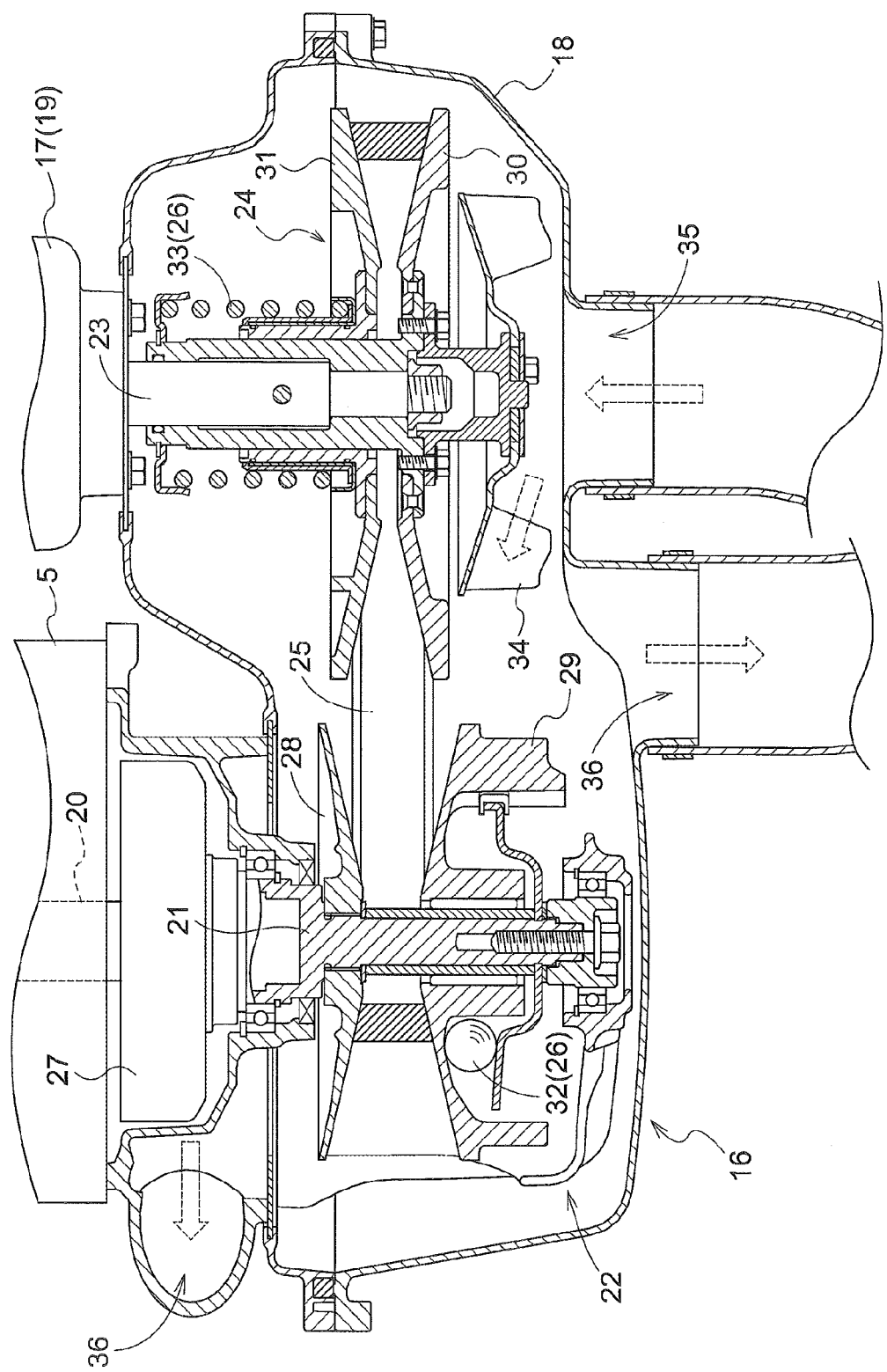
FIG. 2 is a plan view partially in transverse section showing an arrangement of a belt type stepless speed changing mechanism.
Figure 3:
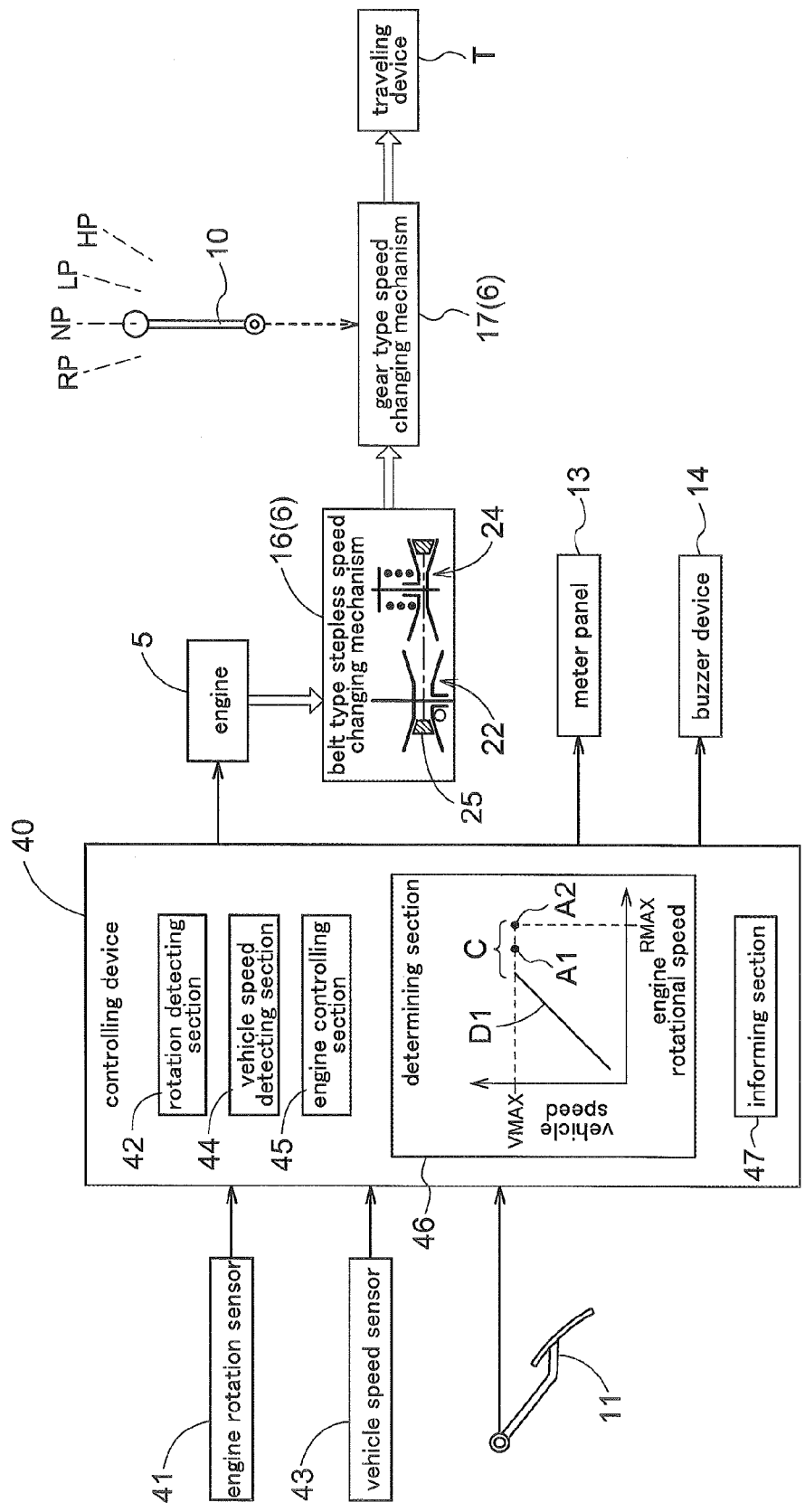
FIG. 3 is a block diagram showing an example of a controlling arrangement and an example of a power transmission arrangement.

As shown in FIGS. 1 through 3, the speed changing device 6 includes a belt type stepless speed changing mechanism 16 of "stepless" speed-changing type, and a gear type speed changing mechanism 17 of "stepwise" speed-changing type. Power from the engine 5 is firstly subjected to a predetermined speed changing by the belt type stepless speed changing mechanism 16 and then subjected to a predetermined speed changing by the gear type speed changing mechanism 17, and eventually transmitted to the traveling device T. The belt type stepless speed changing mechanism 16 is accommodated in a speed changing case 18 disposed on a lateral side of the engine 5. The gear type speed changing mechanism 17 is accommodated in a transmission case 19 disposed rearwardly of the engine 5.

[Belt Type Stepless Speed Changing Mechanism]

As shown in FIG. 2, FIG. 3, etc., the belt type stepless speed changing mechanism 16 is configured to steplessly speed-change power from the engine 5 and to transmit the resultant power toward the traveling device T. As shown in FIG. 2, the belt type stepless speed changing mechanism 16 includes a speed changing input shaft 21 connectable with an output shaft 20 of the engine 5; an input rotary body 22 acting as a drive pulley rotatable together with the speed changing input shaft 21; a speed changing output shaft 23 disposed parallel with the speed changing input shaft 21 and configured to output power to the gear type speed changing mechanism 17; an output rotary body 24 acting as a driven pulley for rotating the speed changing output shaft 23 in unison therewith; a drive belt 25 having a V-shaped cross section, and acting as an endless rotary body that is made of rubber to be wound and stretched around and between the input rotary body 22 and the output rotary body 24; and a winding diameter adjusting mechanism 26 capable of varying a winding diameter of the drive belt 25 around the input rotary body 22 and a winding diameter of the drive belt 25 around the output rotary body 24, in accordance with an engine rotational speed.

As may be understood from FIG. 2, a centrifugal clutch 27 effects connection and disconnection between the output shaft 20 of the engine 5 and the speed changing input shaft 21 of the belt type stepless speed changing mechanism 16. The centrifugal clutch 27 is rendered into a disconnection state if a rotational speed per unit time of the output shaft 20 of the engine 5 (engine rotational speed) is below a set value (e.g. below an idling rotational speed), thus releasing connection between the output shaft 20 of the engine 5 and the speed changing input shaft 21 of the belt type stepless speed changing mechanism 16, so that no power is transmitted to the speed changing input shaft 21. On the other hand, the centrifugal clutch 27 is rendered into a connecting state when the engine rotational speed is equal to or greater than a set value, thus connecting the output shaft 20 of the engine 5 and the speed changing input shaft 21 of the belt type stepless speed changing mechanism 16 for their co-rotation, so that power of the engine 5 is transmitted to the speed changing input shaft 21.

As shown in FIG. 2, the input rotary body 22 includes a driving-side stationary sheave 28 rotatable in unison with the speed changing input shaft 21 and immovable in the axial direction of the speed changing input shaft 21; and a driving-side movable sheave 29 rotatable in unison with the speed changing input shaft 21 and movable in the axial direction of the speed changing input shaft 21. The drive belt 25 is sandwiched between the driving-side stationary sheave 28 and the driving-side movable sheave 29. As the distance between the driving-side stationary sheave 28 and the driving-side movable sheave 29 changes, there occurs corresponding change in the winding diameter of the drive belt 25 around the input rotary body 22.

The output rotary body 24 includes a driven-side stationary sheave 30 rotatable in unison with the speed changing output shaft 23 and unmovable in the axial direction of the speed changing output shaft 23; and a driven-side movable sheave 31 rotatable in unison with the speed changing output shaft 23 and movable in the axial direction of the speed changing output shaft 23. The drive belt 25 is sandwiched between the driven-side stationary sheave 30 and the driven-side movable sheave 31. As the distance between the driven-side stationary sheave 30 and the driven-side movable sheave 31 changes, there occurs corresponding change in the winding diameter of the drive belt 25 around the output rotary body 24.

The winding diameter adjusting mechanism 26 includes a weight roller 32 rotatable in unison with the speed changing input shaft 21; and a center spring 33 rotatable in union with the speed changing output shaft 23. The weight roller 32 is configured to generate a force for pressing the driving-side movable sheave 29 toward the driving-side stationary sheave 28 by means of a centrifugal force associated with rotation of the speed changing input shaft 21. The pressing force provided by the weight roller 32 increases with increase of the engine rotational speed (rotational speed of the speed changing input shaft 21). The center spring 33 provides the driven-side movable sheave 31 with an urging force for pressing the driven-side movable sheave 31 toward the driven-side stationary sheave 30.

With the belt type stepless speed changing mechanism 16 configured as described above in operation, when the engine rotational speed (rotational speed of the speed changing input shaft 21) is below a set value and thereby no driving power is transmitted, then, under the urging force of the center spring 33, the winding diameter of the drive belt 25 on the input rotary body 22 becomes minimal and the winding diameter of the drive belt 25 on the output rotary body 24 becomes maximum, whereby the speed changing ratio becomes maximum. With this belt type stepless speed changing mechanism 16 in operation, as the engine rotational speed is increased from a value equal to or greater than the set value, the pressing force provided by the weight roller 32 against the urging force of the center spring 33 increases correspondingly, whereby the drive belt 25 comes into sliding contact with inclined contact faces of the input rotary body 22 and the output rotary body 24, so that the winding diameter of the drive belt 25 on the input rotary body 22 increases, whereas the winding diameter of the drive belt 25 on the output rotary body 24 decreases, whereby the speed changing ratio steplessly varies to decrease. Further, with this belt type stepless speed changing mechanism 16 in operation, when the engine rotational speed becomes a value greater than the set value, there is provided a predetermined speed changing state in which the winding diameter of the drive belt 25 on the input rotary body 22 becomes maximum, whereas the winding diameter of the drive belt 25 on the output rotary body 24 becomes minimal, whereby the speed changing ratio becomes minimal. In case the engine rotational speed is to be decreased from the predetermined value, operations in reverse sequence to those described above will be effected.

Incidentally, as shown in FIG. 2, on a free end side of the speed changing output shaft 23, there is provided a cooling fan 34 rotatable in unison with the speed changing output shaft 23. In association with rotational drive of the speed changing output shaft 23, the cooling fan 34 generates an air draft which stirs air present inside the speed changing case 18 and cooling air will be taken in from an inlet 35 of the speed changing case 18, and air after cooling is discharged through a plurality of discharge outlets 36, whereby cooling of the drive belt 25, etc. is effected and development of wear of the drive belt 25 due to friction heat is alleviated.

[Gear Type Speed Changing Mechanism]

As shown in FIG. 1 and FIG. 3, the gear type speed changing mechanism 17 can speed-change the power that is inputted from the speed changing output shaft 23 of the belt type stepless speed changing mechanism 16 and output the resultant power toward the traveling device T. As may be understood from FIG. 3, when the speed changing lever 10 is operated to a reverse traveling position RP, the gear speed changing mechanism 17 is rendered into a reverse traveling state for transmitting reverse traveling power to the traveling device T. When the speed changing lever 10 is operated to a neutral traveling position NP, the gear speed changing mechanism 17 is rendered into a neutral state for not transmitting any power to the traveling device T. When the speed changing lever 10 is operated to a forward low speed position LP, the gear speed changing mechanism 17 is rendered into a forward low speed state for transmitting forward traveling low speed power to the traveling device T. When the speed changing lever 10 is operated to a forward high speed position HP, the gear speed changing mechanism 17 is rendered into a forward high speed state for transmitting forward traveling high speed power to the traveling device T.

As shown in FIG. 1, the power outputted from the gear speed changing mechanism 17 is transmitted to the left and right rear wheels 2. Also, the power outputted from the gear speed changing mechanism 17 can be transmitted also to the left and right front wheels 1 via a power takeoff shaft 37 extending to the front side and a propelling shaft 8 extending along the front/rear direction. The multipurpose vehicle has a two-wheel drive state and a four-wheel drive state that are switchable to each other. When a transmission clutch (not show) of the gear speed changing mechanism 17 is disengaged, the vehicle is rendered into the two-wheel drive state in which no power transmission to the propelling shaft 38 is effected, so that the left and right front wheels 11 are not driven, but only the left and right rear wheels 2 are driven. Whereas, when the transmission clutch of the gear speed changing mechanism 17 is engaged, the vehicle is rendered into the four-wheel drive state in which power transmission to the propelling shaft 38 is effected so that both the left and right front wheels 1 and the left and right rear wheels 2 are driven.

[Wear of Drive Belt of Belt Type Stepless Speed Changing Mechanism]

When wear occurs in the drive belt 25 of the belt type stepless speed changing mechanism 16 shown in FIG. 2 and FIG. 3, compared with a case of no wear occurring in the drive belt 25, the belt width of the drive belt 25 decreases, thus causing change in the speed changing ratio. In the instant embodiment, the belt type stepless speed changing mechanism 16 whose drive belt 25 is worn provides a greater speed changing ratio than that provided by the same mechanism whose drive belt 25 is not worn (i.e. shifted to the speed reducing side), so that the engine rotational speed to realize a same vehicle speed is increased.

[Controlling Arrangement]

As shown in FIG. 3, the multipurpose vehicle includes a controlling device 40 for controlling the engine 5 and controlling various informing operations. The controlling device 40 includes a rotation detecting section 42 for detecting an engine rotational speed based on a signal from an engine rotation sensor 41; a vehicle speed detecting section 44 for detecting a vehicle speed of the traveling vehicle body based on a signal from a vehicle speed sensor 43; an engine controlling section 45 for controlling the engine 5; a determining section 46 for effecting various determinations; and an informing section 47 for effecting various informing operations.

The engine controlling section 45 controls the engine 5 such that if a stepped-on amount of the accelerator pedal 11 is zero, the engine rotational speed becomes below a set value through adjustment of a fuel injection amount and an ignition frequency for the engine 5. Further, the engine controlling section 45 basically controls the engine 5 such that the fuel injection amount is increased and the ignition frequency is increased for the engine 5 according to the stepped-on amount of the accelerator pedal 11. Whereas, the engine controlling section 45 controls the engine 5 such that if a vehicle speed detected by the vehicle speed detecting section 44 exceeds a limit maximum vehicle speed VMAX that has been set in advance based on specification of the vehicle, the fuel injection amount and the ignition frequency for the engine 5 are restricted to thereby restrict the engine rotational speed so as not to allow further increase of the vehicle speed, with ignoring the stepped-on amount of the accelerator pedal 11.

In particular, the limit maximum vehicle speed VMAX is set to a value smaller than an upper limit vehicle speed value which is realized when the performance of the engine 5 is exerted to its mechanical limit. Further, if the vehicle speed becomes the limit maximum vehicle speed VMAX, the gear speed changing mechanism 17 is under the forward high speed state (the state when the speed changing lever 10 is set at the forward high speed position HP) and the belt type stepless speed changing mechanism 16 is under the predetermined speed changing state which provides the minimal speed changing ratio.

The determining section 46 is configured to effect various determinations for controlling the engine 5 and controlling various informing operations. More particularly, the determining section 46 determines whether a vehicle speed detected by the vehicle speed detecting section 44 is a predetermined vehicle speed or not. Further, the determining section 46 determines whether an engine rotational speed, that is detected by the rotation detecting section 42 when the vehicle speed detected by the vehicle speed detecting section 44 is the predetermined speed, deviates from a preset permissible range C or not. In the instant embodiment, this "predetermined speed" is the limit maximum vehicle speed VMAX which is set in advance as a vehicle speed for which restriction of the rotational speed of the engine 5 is to be effected.

Moreover, the determining section 46 determines whether or not an engine rotational speed, at which the vehicle speed detected by the vehicle speed detecting section 44 is the limit maximum vehicle speed VMAX, exceeds a predetermined threshold value A2. In the instant embodiment, the threshold value A2 is same as an upper limit value of the permissible range C for the engine rotational speed.

Still further, the determining section 46 determines whether or not the engine rotational speed, at which the vehicle speed detected by the vehicle speed detecting section 44 is the limit maximum vehicle speed VMAX, exceeds a preliminary value A1 which is smaller than the threshold value A2.

With reference to FIG. 3, an example of zero-wear data D1 is shown, representing relationship between an engine rotational speed and a vehicle speed of the multipurpose vehicle mounting the belt type stepless speed changing mechanism 16 whose drive belt 25 is new (that is, not worn). With development of wear in the drive belt 25, the engine rotational speed when the vehicle speed is the limit maximum vehicle speed VMAX approaches the threshold value A2.

Each of the permissible range C, the threshold value A2 and the preliminary value A1 (data to be compared with the engine rotational speed when the vehicle speed detected by the vehicle speed detecting section 44 is the predetermined speed) is set in advance based on relationship between a vehicle speed and an engine rotational speed, obtained when an actual multipurpose vehicle mounting the belt type stepless speed changing mechanism 16 whose drive belt 25 is under a predetermined worn state was caused to run for testing and stored into the determining section 46. Namely, the threshold value A2 is the engine rotational speed with which the limit maximum vehicle speed VMAX is achieved by the belt type stepless speed changing mechanism 16 having the drive belt 25 under the predetermined worn state.

[Preliminary Informing and Alarm Informing]

As shown in FIG. 3 and FIG. 4, the informing section 47 is configured to effect a preliminary informing B1 and an alarm informing B2, by way of information displayed by the meter panel 13 and/or sound generated by the buzzer device 14, according to results of determinations made by the determining section 46. In the instant embodiment, only when the vehicle speed becomes the limit maximum vehicle speed VMAX at which the restriction of the engine rotational speed is to be effected (step #a01: YES), a determination process is effected (step #a02, step #a04).

More particularly, as shown in FIG. 4 etc., when the vehicle speed detected by the vehicle speed detecting section 44 is the predetermined vehicle speed (limit maximum vehicle speed VMAX) (step #a01: YES), if the determining section 46 determines that wear in the drive belt 25 of the belt type stepless speed changing mechanism 16 has developed to a certain degree and that the engine rotational speed detected by the rotation detecting section 42 exceeds the preliminary value A1 (step #a02: YES), then, the preliminary informing B1 is effected (step #a03). In this case, the engine rotational speed detected by the rotation detecting section 42 has not yet exceeded the threshold value A2.

At a subsequent stage after lapse of a certain use period, as shown in FIG. 4, etc., when the vehicle speed detected by the vehicle speed detecting section 44 is the predetermined vehicle speed (limit maximum vehicle speed VMAX) (step #a01: YES), if the determining section 46 determines that wear in the drive belt 25 of the belt type stepless speed changing mechanism 16 has developed considerably and that the engine rotational speed detected by the rotation detecting section 42 has deviated from the permissible range C (step #a04: YES); then, the alarm informing B2 is effected, (step #a05). In other words, if it is determined that the engine rotational speed detected by the rotation detecting section 42 has exceeded the threshold value A2 (step #a04: YES) under the condition of the vehicle speed detected by the vehicle speed detecting section 44 being the predetermined vehicle speed (limit maximum vehicle speed VMAX) (step #a01: YES), then, the alarm informing B2 is effected (step #a05).

Namely, the informing section 47 effects the alarm informing B2 for alarming wear of the drive belt 25 if an engine rotational speed detected by the rotation detecting section 42 when the vehicle speed detected by the vehicle speed detecting section 44 is the predetermined vehicle speed deviates from the preset permissible range C. In other words, the informing section 47 effects the alarm informing B2 if the predetermined vehicle speed is the limit maximum vehicle speed VMAX set in advance as a vehicle speed for effecting restriction of rotation of the engine 5 and the engine rotational speed at this limit maximum vehicle speed VMAX exceeds the threshold value A2. The predetermined vehicle speed in this case is the limit maximum vehicle speed VMAX set by the specification of the vehicle as described above. The limit maximum vehicle speed VMAX is set smaller than the limit vehicle speed which is the mechanical limit. Further, the informing section 47 effects the preliminary informing B1 different from the alarm informing B2, in case the engine rotational speed exceeds the preliminary value A1 which is smaller than the threshold value A2.

In this way, the degree of development of wear in the drive belt 25 of the belt type stepless speed changing mechanism 16 is detected automatically, and the preliminary informing B1 or the alarm informing B2 is effected, whereby a riding person (an operator or a passenger) can readily grasp the appropriate timing to effect a maintenance of the belt type stepless speed changing mechanism 16. Therefore, to determine whether it is necessary to perform a maintenance operation of the belt type stepless speed changing mechanism 16 or not, disassembling of this belt type stepless speed changing mechanism 16 is not needed. Further, a maintenance can be prompted in a timely manner by the alarm informing B2 prior to failure and damage of the drive belt 25.

[Restriction of Engine Rotational Speed]

As shown in FIG. 5, if the engine rotational speed becomes equal to or greater than a limit rotational speed RMAX which is set in advance based on the specification (step #b01: YES), the engine controlling section 45 forcibly restricts the fuel injection amount for the engine 5 (making the fuel injection amount zero or decreases the fuel injection amount) and reduces the ignition frequency (not to effect any ignition or reduce ignition frequency), irrespectively of any vehicle speed detected by the vehicle speed detecting section 44 (step #b02). Namely, the engine controlling section 45 is configured such that when the engine rotational speed detected by the rotation detecting section 42 exceeds the limit rotational speed RMAX set based on the threshold value A2, the engine rotational speed is restricted even when the vehicle speed has not reached the limit maximum vehicle speed VMAX. With this, the engine controlling section 45 controls the engine 5 not to raise the engine rotational speed beyond the limit rotational speed RMAX.

The limit rotational speed RMAX is set as a value smaller than an upper limit rotational value which is the mechanical limit of the engine 5. In the instant embodiment, the limit rotational speed RMAX has a same value as the threshold value A2 for effecting the alarm informing B2.

Since excessive rising of the engine rotational speed is avoided as described above, it is possible to avoid occurrence of undesirable phenomenon such as valve surging or valve bounce etc. in the engine 5, and application of excessive load to the driving system. Further, it is also possible to avoid inconvenience that deviation of the engine 5 from the ideal air-fuel ratio leads to mixing of a great amount of soot, such as one in form of exhaust gas fine particles, into the exhaust gas from the engine 5.

[Other Embodiments]

Other embodiments of the present invention will be described next. It is understood that the following other embodiments can be selectively applied, either alone or in a plurality of combinations, to the foregoing embodiment as long as no contradiction occurs and that the present invention is not limited to the contents of these embodiments.

(1) In the foregoing embodiment, the preliminary informing B1 and the alarm informing B2 are effected by comparing the engine rotational speed detected by the rotation detecting section 42 with the permissible range C, the threshold value A2 and the preliminary value A1, only when the vehicle speed detected by the vehicle speed detecting section 44 is the limit maximum vehicle speed VMAX. However, this is not limitative.

FIG. 6 shows an exemplary alternative configuration. In furtherance to the zero-wear data D1 in the foregoing embodiment as described above with reference to FIG. 3, the determining section 46 may store wear data D2 that are prepared by mapping and recording relationship between a vehicle speed provided by the belt type stepless speed changing mechanism 16 whose drive belt 25 is worn, and an engine rotation speed corresponding thereto. Based on the wear data D2, the determining section 46 may set the permissible range C, the preliminary value A1 and the threshold value A2. By comparing detection data with the permissible range C, the threshold value A2, the preliminary value A1, the preliminary informing B1 and the alarm informing B2 will be effected.

In this alternative embodiment, the preliminary value A1 and the threshold value A2 may be set in a wide range of vehicle speed between the zero-wear data D1 and the wear data D2. Namely, the predetermined vehicle speeds for effecting the determination for the preliminary informing B1 and the alarm informing B2 are not limited to those determined based on the limit maximum vehicle speed VMAX, but may be any vehicle speeds chosen within the vehicle speed range in which the preliminary value A1 and the threshold value A2 are set.

(2) In the foregoing embodiment, the threshold value A2 is a same value as the upper limit of the permissible range C. However, this is not limitative. For instance, the threshold value A2 can be a same value as the lower limit of the permissible range C for the engine rotational speed. In this case, there is provided a different belt type stepless speed changing mechanism configured such that its speed changing ratio decreases with wear of the drive belt 25 and an engine rotational speed for realizing a same vehicle speed is smaller. Further alternatively, the threshold value A2 can be a value out of the permissible range C for the engine rotational speed.

(3) In the foregoing embodiment, the threshold value A2 is a same value as the limit rotational speed RMAX. However, this is not limitative. For instance, the threshold value A2 can be a value different from the limit rotational speed RMAX.

(4) In the foregoing embodiment, only one preliminary value A1 is set. However, this is not limitative. For instance, a plurality of preliminary values A1 can be set. With this, according to development of wear in the drive belt 25 of the belt type stepless speed changing mechanism 16, the preliminary informing B1 will be effected in a plurality of stages.

(5) In the foregoing embodiment, the predetermined speed is the limit maximum vehicle speed VMAX which is set in advance as a vehicle speed for which restriction of the rotational speed of the engine 5 is to be effected. However, this is not limitative. For instance, the predetermined speed can be set to a value smaller than the limit maximum vehicle speed VMAX which is set in advance as a vehicle speed for which restriction of the rotational speed of the engine 5 is to be effected.

(6) In the foregoing embodiment, an actual vehicle mounting a belt type stepless speed changing mechanism 16 having a drive belt 22 under a predetermined worn state is caused to run for testing, and then based on result of this test run of the actual vehicle, the threshold value A2, etc. to be compared with the engine rotational speed at the time of the limit maximum vehicle speed VMAX is set. However, this is not limitative. For instance, the setting of the threshold value A2, etc., can be effected based not on test run data of an actual vehicle, but on simulation data.

(7) In the foregoing embodiment, the meter panel 13 was shown as an example of the displaying device and the buzzer device 14 was shown as an example of sound generating device. However, this is not limitative. For instance, as the displaying device and the sound generating device, various kinds of devices can be used. In effecting the preliminary informing B1 and/or the alarm informing B2, informing can be effected by both the displaying device and the sound generating device or can be effected by only one of them.

(8) In the foregoing embodiment, when the engine rotational speed exceeds the limit rotational speed RMAX, restriction of fuel injection amount for the engine 5 is effected and also restriction of ignition for the engine 5 is effected. However, this is not limitative. For instance, it is also possible to arrange such that when the engine rotational speed exceeds the limit rotational speed RMAX, only one of the restriction of fuel injection amount for the engine 5 and the restriction of ignition for the engine 5 is effected. Further alternatively, it is possible to arrange such that even when the engine rotational speed exceeds the limit rotational speed RMAX, neither the restriction of fuel injection amount for the engine 5, nor the restriction of ignition for the engine 5 is effected.

(9) In the foregoing embodiment, a drive belt formed of rubber was shown as an example of the drive belt 25. However, this is not limitative. For instance, the drive belt 25 can be formed of metal.

(10) In the foregoing embodiment, a multipurpose vehicle was shown as an example of work vehicle. However, the work vehicle is not limited thereto, but includes various kinds of work vehicle, such as an all-terrain vehicle, a tractor, a lawn mower, etc.

What is claimed is:

1. A work vehicle comprising:
a traveling device;
a traveling vehicle body that is self-propelled by the traveling device;
an engine mounted on the traveling vehicle body;
a belt type stepless speed changing mechanism having an input rotary body, an output rotary body, and a drive belt wound around and between the input rotary body and the output rotary body, the belt type stepless speed changing mechanism being configured to steplessly speed-change power from the engine and to transmit the speed-changed power toward the traveling device;
a rotation detecting section for detecting a rotational speed of the engine;
a vehicle speed detecting section for detecting a vehicle speed of the traveling vehicle body; and
an informing section, wherein if the vehicle speed detected by the vehicle speed detecting section is a predetermined speed and if the engine rotational speed detected by the rotation detecting section deviates from a preset permissible range, the informing section is configured to effect an alarm informing for alarming wear of the drive belt.

2. The work vehicle of claim 1, wherein:
the predetermined vehicle speed is a limit maximum vehicle speed which is preset as a vehicle speed that requires restriction of rotation of the engine; and
the informing section effects the alarm informing if the engine rotational speed at the time of the limit maximum vehicle speed exceeds a predetermined threshold value.

3. The work vehicle of claim 2, wherein:
the threshold value is an engine rotational speed at which the limit maximum vehicle speed is achieved in the belt type stepless speed changing mechanism having the drive belt which is under a predetermined wear state.

4. The work vehicle of claim 2, wherein:
the informing section effects a preliminary informing which is different from the alarm informing, if the engine rotational speed exceeds a preliminary value which is smaller than the threshold value.

5. The work vehicle of claim 2, wherein:
the engine rotational speed is restricted if this engine rotational speed exceeds a limit rotational speed which is set based on the threshold value, even if the vehicle speed does not reach the limit maximum vehicle speed.

* * * * *